(No Model.)
I. B. CUSHING.
CONDENSER.
No. 302,684. Patented July 29, 1884.
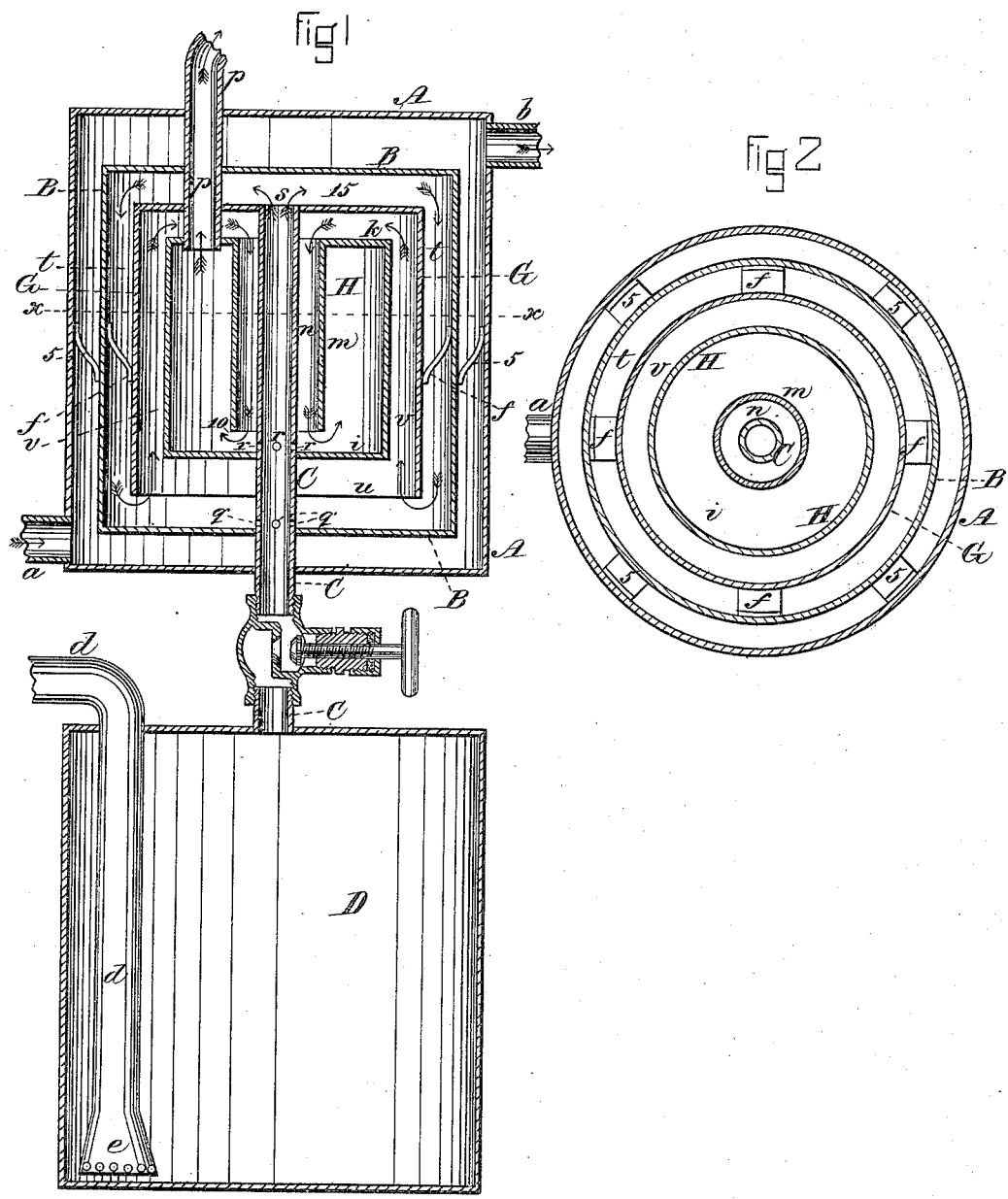
WITNESSES
W. H. Cambridge
Chas. E. Griffin
INVENTOR
Ira B. Cushing

UNITED STATES PATENT OFFICE.

IRA B. CUSHING, OF BROOKLINE, ASSIGNOR TO THE CUSHING PROCESS COMPANY, OF BOSTON, MASSACHUSETTS.

CONDENSER.

SPECIFICATION forming part of Letters Patent No. 302,684, dated July 29, 1884.

Application filed November 23, 1883. (No model.)

*To all whom it may concern:*

Be it known that I, IRA B. CUSHING, a citizen of the United States, residing at Brookline, in the county of Norfolk and State of Massachusetts, have invented certain Improvements in Condensers, of which the following is a full, clear, and exact description, reference being had to the accompanying drawings, making part of this specification, in which—

Figure 1 is a vertical central section of a condenser constructed in accordance with my invention, and applied to the spirit-tank of an apparatus for purifying and maturing liquors. Fig. 2 is a horizontal section on the line $x\ x$ of Fig. 1.

My invention relates to an improvement in condensers for use in apparatus for purifying and maturing liquors, and has for its object to accelerate the process of condensation and diminish the number of pipes within or leading to the condenser, thus reducing the number of joints to a minimum and simplifying the construction of the apparatus.

In that class of apparatus in which the liquor is purified and matured by forcing through it, with a suitable pump, air previously purified and heated, the alcoholic vapors, owing to the pressure of the air behind them, are caused to pass upward very rapidly into the condenser, through and out of which a large portion is frequently carried by the force of the current of air before having time to become condensed, considerable loss thereby resulting. It therefore becomes desirable to effect the condensation of these alcoholic vapors as rapidly and perfectly as possible, and also effect the quick return of the condensed liquid to the main tank containing the spirits being treated, and thus avoid the choking or obstruction of the condenser by the accumulation of an excess of liquid therein.

To this end my present invention consists in a condenser of novel construction, in which the alcoholic vapors from the spirit-tank are brought immediately into contact with the interior surface of the condenser at the periphery, which presents the largest surface area, and is coldest on account of its proximity with the refrigerating-liquid, the vapors thence passing toward the center of the condenser to the eduction-pipe, the main pipe through which the alcoholic vapors enter the condenser being provided within the same with apertures for the passage of the condensed liquid thereto, which thus flows directly back to the spirit-tank by the same pipe through which the vapors are conducted to the condenser, whereby the necessity is avoided of providing separate pipes for the return of the condensed liquid, as is customary with the ordinary construction, which pipes are liable, owing to their small size, to become clogged or obstructed by the liquid produced by the rapid condensation of the vapors.

In the said drawings, A represents a closed vessel, preferably of cylindrical form, which is provided near its bottom with an induct, $a$, and near its top with an educt, $b$, through which cold water or other suitable refrigerating liquid is respectively admitted to and discharged from the vessel A. Within this vessel A is secured, by means of braces 5, a tightly-closed vessel or cylinder, B, which constitutes the main portion of the condenser, and is connected by a pipe, C, with the closed tank or retort D, which contains the spirits to be treated, and through which is disseminated by means of a pipe, $d$, provided at its lower end with a perforated enlargement or spreader, $e$, a supply of air previously purified and heated by being forced by means of a suitable air-pump through a series of closed tanks provided with suitable well-known means for accomplishing this result.

Centrally within the cylinder B is secured, by means of braces $f$, or otherwise, a vessel or cylinder, G, open at its bottom and closed at the top, the upper extremity of the main pipe C, through which the alcoholic vapors are forced from the spirit-tank D, projecting just through the closed top of this cylinder G, between which and the top of the cylinder B is a space, 15.

Within the cylinder G is placed a third vessel or cylinder, H, which is provided with a closed bottom, $i$, and a top, $k$, closed except at the center, at which point it has secured to it a tube, $m$, which encircles the pipe C, and extends nearly to the bottom of the cylinder H, into which it opens at 10, as seen in Fig. 1. The pipe C passes through the bottoms of the cylinders A, B, and H with perfectly tight joints, and between the pipe C and the tube *m* is an annular space, *n*, through which the alcoholic vapors pass from the cylinder G to the cylinder H, which latter cylinder communicates at its top with an eduction-pipe, *p*, through which the non-condensible portion of the vapors containing the volatile oils and other impurities pass off out of the condenser.

Immediately above or on a level with the bottom of the cylinder B the main pipe C is provided with a series of apertures, *q*, and just above or on a level with the bottom of the cylinder H it is also provided with a similar series of apertures, *r*, these apertures *q r* thus affording a direct outlet for the condensed liquid into the main pipe C, through which they flow back to the spirit-tank D beneath.

The operation is as follows: The alcoholic vapors and air, as they are forced by the pressure in the spirit-tank D up through the pipe C, enter the cylinder B at *s*, and thence pass immediately through the space 15 between the upper ends of the cylinders B G, from the center to the periphery of this cylinder B and down, as indicated by the arrows, Fig. 1, through the annular space *t* between the cylinders B and G, up under the lower edge, *u*, of the cylinder G, through the annular space *v*, between the interior of the cylinder G and the cylinder H, and thence toward the center of the apparatus, passing down through the tube *m* and between it and the pipe C into the cylinder H at 10; thence up into said cylinder H and out of the condenser through the eduction-pipe *p*. It will be apparent that as the alcoholic vapors pass through the space *t* they are brought, almost immediately after leaving the pipe C, into contact with a large surface area which constitutes the coldest portion of the condenser, owing to its close proximity with the refrigerating-liquid in the vessel A, which is an important advantage, as it insures the rapid condensation of the vapors at the outset, and prevents the alcohol from being carried out of the condenser by the force of the upward current of air, and thus becoming lost, while, as that portion of the vapors not condensed in the space *t* passes onward toward the center of the apparatus, as above described, they are brought into contact with a large area of cooling-surface, and thus so perfectly condensed that only the non-condensable portion, which contains the volatile oils and other impurities, will pass off through the eduction-pipe *p*. Furthermore, by providing the main pipe C at its junction with the lowest portions of the cylinders B H, in which the condensed liquid is collected, with apertures *q r*, this liquid is caused to flow back to the spirit-tank D by the same large pipe through which the air and vapors are conducted to the condenser, thus simplifying the apparatus and rendering it unnecessary to provide separate pipes for this purpose, while the clogging or obstruction of the condenser by the undue accumulation of condensed liquid is entirely avoided.

What I claim as my invention, and desire to secure by Letters Patent, is—

1. In an apparatus for purifying and maturing liquors, a condenser composed of an outer vessel, A, a closed vessel or cylinder, B, containing an open-bottomed vessel or cylinder, G, in communication with the eduction-pipe and arranged with an annular space, *t*, between them, in combination with the central induction-pipe, C, opening into the space 15, between the upper ends of the cylinders B G, whereby the air and alcoholic vapors are caused to pass at first from the center of the condenser to its periphery, and thence return from the periphery to the center before escaping into the eduction-pipe, substantially as and for the purpose set forth.

2. In an apparatus for purifying and maturing liquors, the combination, with the closed vessel or cylinder B and the open-bottomed vessel or cylinder G, in communication with the eduction-pipe and arranged with an annular space, *t*, between them, of the central induction-pipe, C, opening into the space 15, between the upper ends of the cylinders B G, and provided with apertures for the return of the condensed liquid to the spirit-tank by means of the pipe C, all constructed to operate substantially in the manner and for the purpose described.

3. In an apparatus for purifying and maturing liquors, the combination of the outer vessel, A, the closed vessel or cylinder B, and the open-bottomed vessel or cylinder G, arranged with an annular space, *t*, between them, the vessel or cylinder H, arranged within the cylinder G, and having a central open-bottomed tube, *m*, extending down from its top, the central induction-pipe, C, extending from the spirit-tank D up through the cylinders A B G H and tube *m*, and opening into the space 15, and having apertures *q r* at or near the level of the bottoms of the cylinders B H, whereby the condensed liquid in both of the cylinders B H is returned to the spirit-tank through the same pipe by which the vapors pass to the condenser, and the eduction-pipe *p*, leading from the cylinder H through the cylinders G B A, all constructed and arranged to operate substantially in the manner and for the purpose set forth.

Witness my hand this 9th day of November, A. D. 1883.

IRA B. CUSHING.

In presence of—
P. E. TESCHEMACHER,
W. J. CAMBRIDGE.